United States Patent [19]

Casper et al.

[11] Patent Number: 4,620,927
[45] Date of Patent: Nov. 4, 1986

[54] POLYMERIC MICROSCREEN SUPPORT WHEEL AND ASSEMBLY

[75] Inventors: Thomas J. Casper, Waukesha; Susan M. Rasper, Brookfield, both of Wis.

[73] Assignee: Envirex Inc., Waukesha, Wis.

[21] Appl. No.: 735,240

[22] Filed: May 17, 1985

[51] Int. Cl.$^4$ .................. B01D 33/10; B01D 35/00
[52] U.S. Cl. ................... 210/236; 210/403; 210/404; 210/541; 210/542
[58] Field of Search ............. 210/780, 784, 359, 402, 210/403, 404, 541, 542, 232, 236; 384/536, 569, 908, 549, 557; 29/148.4 R, 148.4 D

[56] References Cited

U.S. PATENT DOCUMENTS

| | | | |
|---|---|---|---|
| 384,023 | 6/1888 | Corbett | 384/549 |
| 2,430,487 | 11/1947 | Wessenger | 384/549 |
| 2,757,054 | 7/1956 | Van De Warker | 384/569 |
| 4,038,187 | 7/1977 | Saffran | 210/403 |
| 4,416,492 | 11/1983 | Singletary | 428/332 |

Primary Examiner—Frank Sever
Attorney, Agent, or Firm—Lawrence J. Crain

[57] ABSTRACT

A microscreen support wheel and assembly is provided comprising a polymeric support wheel having a crowned tread surface, an annular stress relief groove cut into each of its vertically flat, substantially parallel side faces and an axial bore designed to rotate around an axis included in a support wheel assembly constructed and arranged to hold a pair of microscreen support wheels in a laterally adjacent relationship on a rigid microscreen frame at an angle whereby optimum drum support is achieved.

12 Claims, 6 Drawing Figures

POLYMERIC MICROSCREEN SUPPORT WHEEL AND ASSEMBLY

BACKGROUND OF THE INVENTION

This invention relates generally to rotary drum screens commonly known as microscreens used for the filtration of liquids in conjunction with water treatment, sewage treatment, and industrial waste treatment. In particular, this invention relates to an improved microscreen drum support apparatus which includes the use of polymeric support wheels.

Microscreens of the type involved herein are well known in the art, for U.S. Pat. No. 4,038,187 is directed to improvements in such a drum. The construction of such devices may be easily understood by referring to FIG. 1. As shown, microscreens comprise a drum 10 having a closed end 11, an open end 12, a central axis 13, a radial outer surface 14, a plurality of microscreen grids 15 mounted on the radial outer surface 14 of the drum 10, means 16 for introducing the liquid to be filtered into the interior of the drum 10, means for rotating the drum about its central axis 13, a backwash header 20 mounted above the radial outer surface of the drum 10, a backwash receiving trough (not shown) mounted within the drum 10 for collecting solids washed off the microscreen grids 15 by the backwash header 20, and means (not shown) for controlling the speed at which the rotating means rotates the drum 10 and/or for controlling the output of the backwash header 20 in response to the accumulation of solids on the microscreen grids 15.

The microscreen drum 10 is mounted in a rectangular tank 5 and is rotatably supported on a frame 30 by a journal bearing 32 on the central axis 13 at the closed end 11 and a plurality of support wheels 36 mounted at the opened end 12 of drum 11 and constructed and arranged to rotate on the inner peripheral rim 34 of drum 10. The axial bore 38 of wheels 36 rotates on bearings 39 rotating on axle 46 attached to truck 44 which pivotally engages elongate connecting member 42 attached to frame 30 at base 41.

Wastewater enters the feed well 17 through inlet 16 where it accumulates until it exceeds the height of the inner weir 19. The water then rushes into the interior of rotating drum 10 and its plurality of microscreen grids 15 which trap suspended particulate materials contained in the water. The trapped particulates are rotatably transported to an upper region where they are flushed from the grids 15 into a collection trough (not shown) by a backwash header 20. The outer edge of the open end 12 of the drum 10 is sealed so that incoming water can only get to the exit weir 18 through grids 15. The filtered water flows through the grid 15 and, once it exceeds the height of the exit weir 18, spills into the collection chamber 21.

Microscreens are subject to a certain degree of misalignment between the drum 10 and frame 30 as a result of the hydraulic thrust force of incoming water against the closed end 11 of drum 10. This force tends to push the drum 10 longitudinally on its central axis 13 toward the exit end of the apparatus. Misalignment of the microscreen drum and frame also results from often imprecise on-site installation practices. Although a certain amount of misalignment can be accommodated for by the design of the journal bearing 32, the need for a freely rotatable drum makes this misalignment a chronic condition. Consequently, microscreen support wheels must be adaptable to a certain degree of lateral load shifting as they rotatably support the open end 12 of the rotating drum 10.

In addition, microscreen wheels must be able to withstand loading forces from the weight of both the drum and the wastewater contained therein, which are of the magnitude of 7,500 pounds per set of two 12 inch diameter wheels.

Thus, as a result of the inherent misalignment and significant loading due to their relatively small diameters, microscreen support wheels must also be able to perform their principal role of drum support in many instances when the drum is only in partial contact with the tread surface of the wheel. The wheels must be designed so that this excessive edge loading does not cause the resulting imbalanced loads to be transferred eccentrically to hub bearings and wheel supports, which function best when the drum loading force is directed over the center of the wheel.

Conventional steel microscreen support wheels have such a high coefficient of friction that when misalignment occurs, the microscreen drum 10 jumps jerkily back and forth along the longitudinal central axis, creating excessive vibration, noise and impact loads which decrease the usable life of the drum 10.

Furthermore, steel microscreen support wheels decay fairly rapidly in the highly corrosive environment of a wastewater treatment facility, and their frequent replacement significantly increases the cost of operation for microscreen systems.

Conventional polymeric wheels and casters have been found to be unsuitable to microscreen applications because their combination of structural geometry and material composition render them unable to withstand both the tremendous support loads and the significant rotational edge loading inherent in microscreen operation.

Thus, there is a need for a corrosion-resistant microscreen support wheel with a tread surface having a relatively low coefficient of friction which will cause negligible drum vibration yet allow for drum slippage, as well as being able to withstand a significant edge loading while causing minimal load transfer of imbalanced loads to the wheel hub and wheel supports.

It is therefore a principal objective of the present invention to provide a microscreen support wheel which has a tread surface having a coefficient of friction substantially lower than that of steel-on-steel (0.57-0.80) which will allow the rotating drum to readily slide across that tread surface.

It is a further objective of the present invention to provide a microscreen support wheel able to withstand excessive loading in the order of 3,500 to 5,000 pounds, even when that load is directed substantially to the edge of that wheel.

It is a still further objective of the present invention to provide a microscreen support wheel which is resistant to the corrosive environment of a wastewater treatment facility.

It is another objective of the present invention to provide a microscreen support wheel which generates a minimal amount of operational vibration and noise.

SUMMARY OF THE INVENTION

The present invention discloses a polymeric microscreen support wheel assembly including a support wheel constructed of a relatively resilient, self-lubricating, chemical-resistant nylon material which gives the tread surface a low coefficient of friction compared to conventional steel wheels. The molding of this specially formulated polymeric material into a shape having inherent stress relief geometry gives the wheel of the present invention the capability of withstanding the significant edge loads inherent in microscreens while minimizing the transmission of unbalanced loading forces to the wheel bearing and the wheel support apparatus. Also, operational vibration, noise and wear on microscreen components such as the outer peripheral rim have been significantly reduced by the present invention.

More specifically, the microscreen support wheel of the present invention comprises two substantially parallel side faces, an axial bore and a tread surface on the outer periphery. Each side face has an annular stress relief groove which is constructed and arranged to transmit unbalanced edge loading forces to the central region of the axial bore. This direction of forces allows loading from the peripheral area of the tread to be directly transmitted to the hub region in a uniformly distributed manner.

In addition, the tread surface is crowned to assist in the distribution of edge loading forces to the hub area.

Lastly, the microscreen support wheel assembly of the present invention is designed to place the microscreen support wheels in the optimum position for drum support.

DESCRIPTION OF THE DRAWINGS

The present invention and its many attendant objects and advantages will become better understood by reference to the following drawings, wherein.

DESCRIPTION OF THE PREFERRED EMBODIMENT

Figure 1:
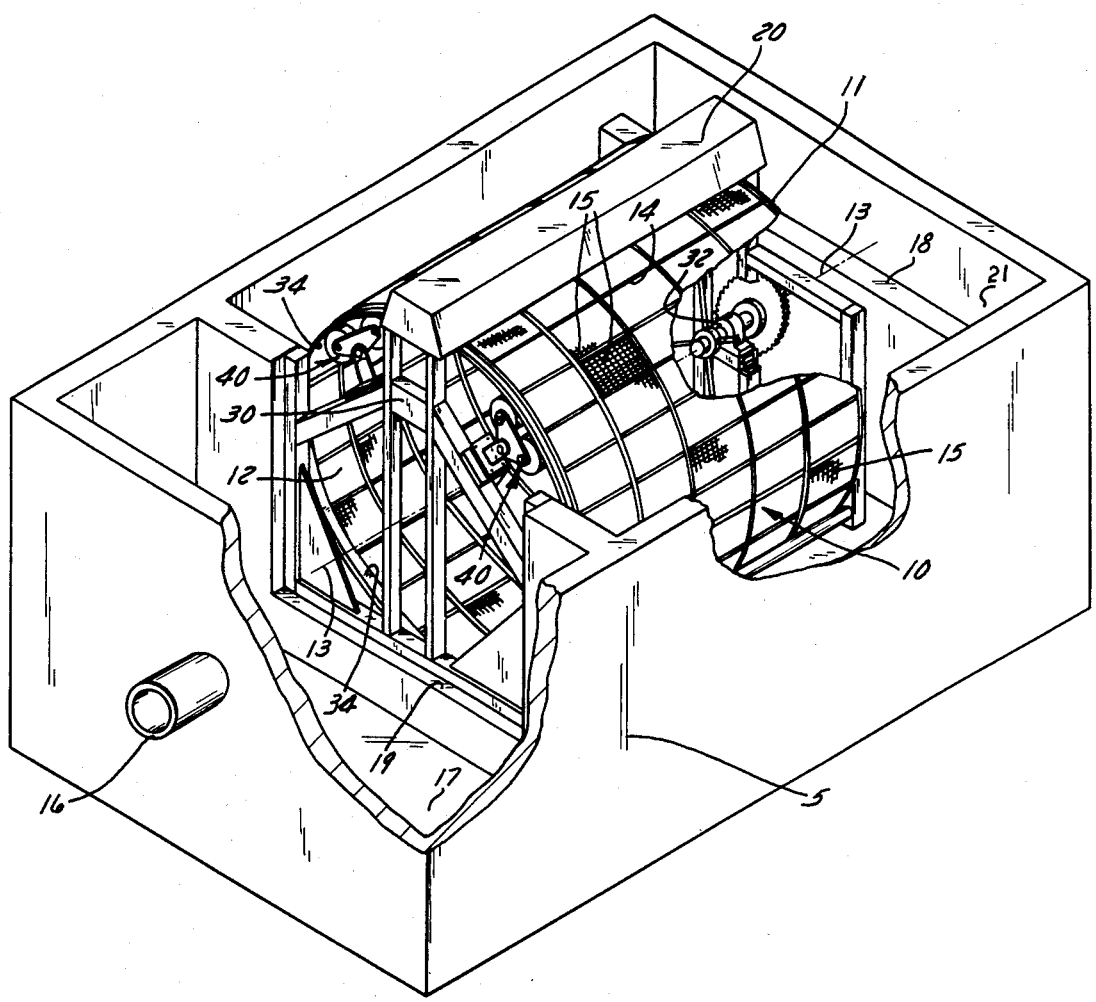
FIG. 1 is a perspective view of a rotary drum screen installation incorporating the present invention.
Figure 2:
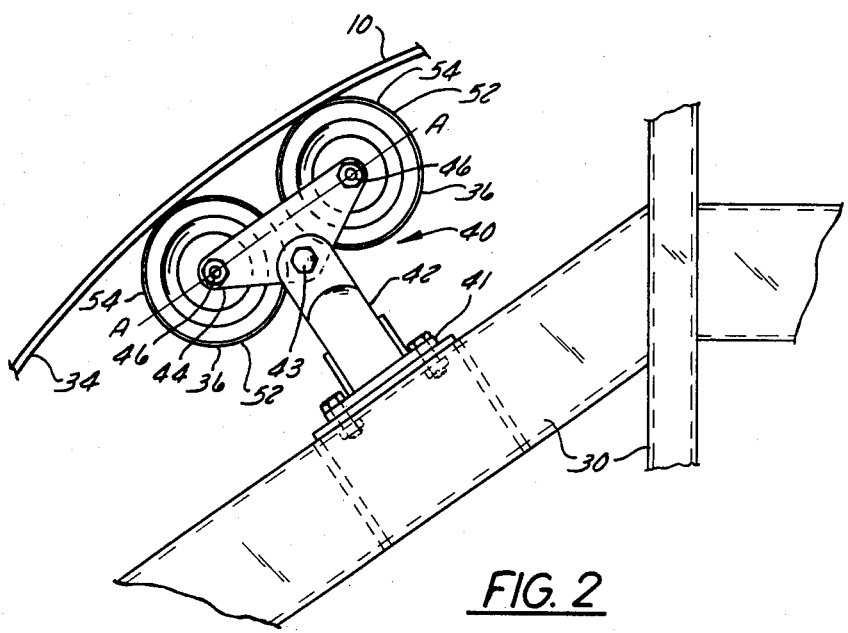
FIG. 2 is an elevational view of a microscreen support wheel assembly mounted on a frame.
Figure 3:
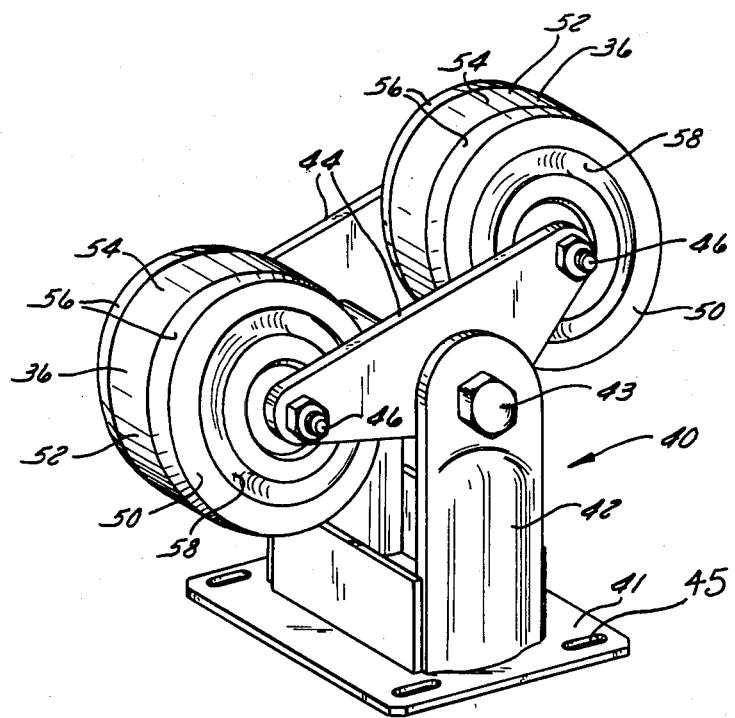
FIG. 3 is a perspective view of the assembly depicted in FIG. 2.
Figure 4:
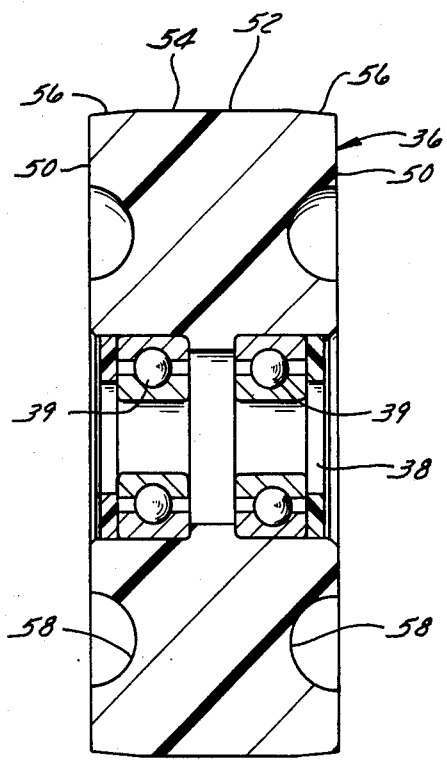
FIG. 4 is a sectional view of a preferred embodiment of the microscreen support wheel of the present invention.

Referring to the drawings, wherein like reference characters designate identical or corresponding parts, FIG. 1 has been described in detail above, and FIGS. 2, 3 and 4 illustrate a microscreen support wheel and assembly embodying the features of the present invention.

FIG. 2 illustrates how the dual wheel microscreen assembly 40 is mounted on the frame 30. An elongate connecting member 42 is integrally engaged to base 41, which is fixed to frame 30 so that the longitudinal axis of member 42 is substantially oriented on a radius line drawn from the center of the drum 10. A truck 44 is pivotably secured to the free end of connecting member 42, and provides the axes 46 upon which a pair of microscreen support wheels 36 rotate via bearings 39. It is preferred that the plane resulting from line A—A, drawn between the axes of adjacent microscreen wheels 36 be substantially perpendicular to the longitudinal axis of the connecting member 42 so that optimum load distribution and support wheel-drum alignment is achieved. Proper wheel-drum alignment may be regulated by slidably adjusting assembly 40 on frame 30 using elongate mounting slots 45 in base 41.

Referring now to FIG. 4, a microscreen support wheel 36 of the present invention is shown in section. Support wheel 36 is fabricated from a nylon material having the characteristics of inherent lubricity (due to the addition of molybdenum disulfide), low water absorption, good chemical resistance to elements found in wastewater, low deformation under load, and a substantial flexural modulus. A preferred material is NYLATRON ® brand nylon produced by Polymer Corporation of Reading, Pa., or other material having similar characteristics. The use of NYLATRON ® brand nylon with the above-identified characteristics results in a wheel with a coefficient of friction in the approximate range of 0.15 to 0.35, which allows the drum to easily slide back and forth with minimal vibration. In comparison, the coefficient of friction for conventional steel wheels against the steel peripheral rim 34 usually falls within the approximate range of 0.57 to 0.80. In addition, the resiliency of the preferred material provides a shock absorbing function which decreases the rate of wear of the drum 10, the peripheral rim 34 and the wheel 36. Also, NYLATRON ® brand nylon is not subject to rust or other corrosion which decreases the usable life of conventional microscreen steel wheels.

A major drawback to utilizing conventional polymeric wheels is their tendency to deform or crack under heavy loads well within the magnitude encountered with microscreens. Consequently, the geometry of the polymeric wheel had to be modified to compensate for this deformation, so that the load forces would be directed toward the central portion of the wheel 36 and dissipated wherever possible.

Support wheel 36 is comprised of two identical side faces 50 and a tread surface 52 on the outer periphery. Side faces 50 are substantially parallel to each other to distribute loads evenly through the wheel 36 to bearings 39 mounted in the axial bore 38. The tread surface 52 is comprised of a flat center section 54 and two edges 56 which slope away from the center section, forming a crown. The flat section 54 is designed to provide a maximum contact load bearing surface for the peripheral rim 34 of drum 10 to slide on as the drum 10 slides along its longitudinal axis 13 in response to the misalignment caused by the above-mentioned hydraulic thrust. When the drum is subject to maximum misalignment, the sloping edges 56 are designed to direct the edge load forces toward the center of wheel 36 to prevent deformation or cracking. In the preferred embodiment, center section 54 comprises the approximate inner one-half of tread surface 52 and the crowned edges 56 make up the remaining one-half of the tread surface. It is also preferred that the angle at which edges 56 slope away from central section 54 is on the order of 1°.

Each side face 50 of support wheel 36 is fabricated with an annular stress relief groove 58, designed to minimize deformation of the wheel by directing the load, and more particularly, the edge load, toward the center of the wheel and dissipating it wherever possible. The stress relief grooves accomplish this function by intercepting or altering the stress pattern created when the wheel is subject to edge loading conditions.

In the preferred embodiment, the stress relief groove 58 is located approximately midway between the peripheral tread 52 and the axial bore 38. The groove 58 also occupies on the order of one-sixth to one-fourth the distance between tread 52 and axial bore 38. Care must be taken to leave enough distance between the upper and lower edges of groove 58 and both peripheral tread 52 and the axial bore 38 to preserve the load carrying characteristics of the wheel 36. Also it is desirable to cut the stress relief grooves 58 to a depth of approximately one-fourth to one-eighth the total thickness of the wheel 36 to compromise between the functions of stress relief and load carrying capacity. Too deep a groove would provide good stress relief, but poor loading carrying characteristics. Too shallow a groove would provide good load bearing characteristics, but poor stress relief.

Figure 4A:
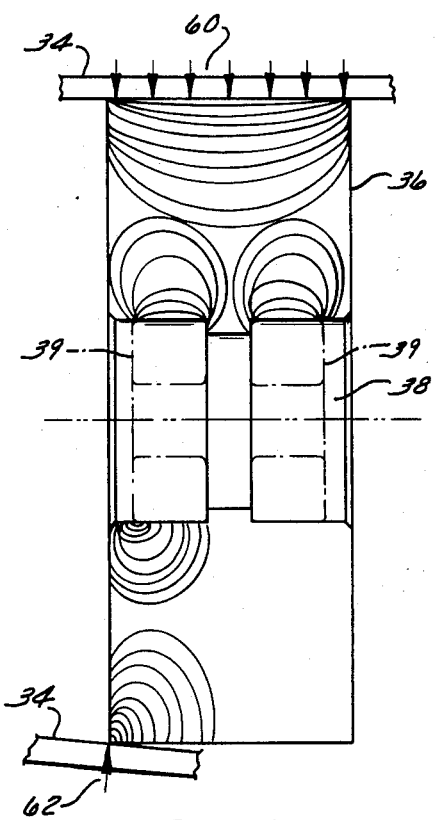
FIG. 4a is a sectional view of a conventional microscreen support wheel showing the stress patterns resulting from the transmission of loads.

Referring to FIG. 4a, which depicts a conventional, non-grooved, non-crowned wheel, the top half of which is depicted as being subject to central loading, and the bottom half is depicted as being subject to edge loading, it is seen that when the drum 10 is in the normal operating position 60, the load forces are transmitted substantially directly to the center of the wheel, causing negligible deformation. However, when the drum 10 is subject to misalignment and slides along its longitudinal axis to create an edge load 62 on one edge 56 of wheel 36, a severe concentration of force is exerted on the outer portion of the wheel as shown at 62. The result of this type of stress is severe deformation or even cracking of the conventional polymeric wheel, severely decreasing its utility.

Figure 4B:
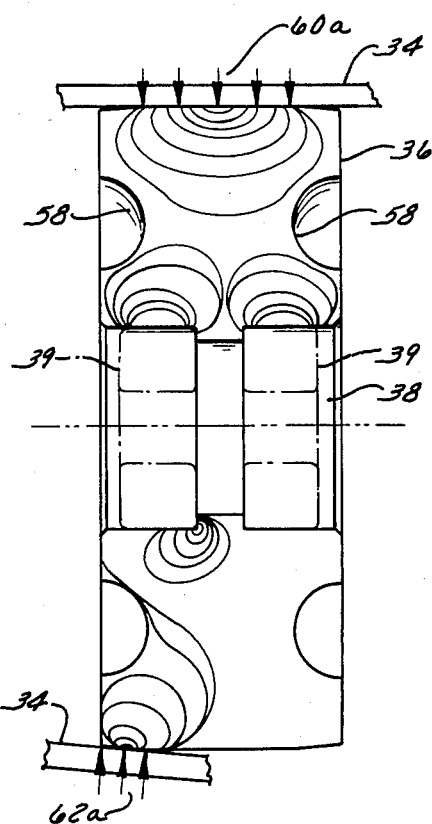
FIG. 4b is a sectional view of the microscreen support wheel shown in FIG. 2 which reveals the transmission of loading forces encountered by the present invention.

Alternatively, FIG. 4b depicts a microscreen support wheel 36 also depicted as experiencing central loading on its top half and edge loading on its bottom half. Wheel 36 has a crown tread surface 52 and a stress relief groove 58 cut into each side face. It can be seen that when the flat center section 54 is subjected to a loading force 60a, a similar stress pattern is created to that and the uncrowned, ungrooved wheel in FIG. 4a. However, when an edge loading force 62a is applied, the presence of stress relief grooves 58 and crowned tread 56 serve to direct some of the force and dissipate the remainder of the force so that deformation of wheel 36 is prevented.

Thus, the microscreen support wheel and assembly of the present invention provides a microscreen support system which is capable of withstanding severe edge loads without deformation, is not subject to the corrosive environment of wastewater treatment facilities, and has a low coefficient of friction which allows the microscreen drum to easily slide along its longitudinal axis in response to inherent misalignment without causing severe vibration and wear on the microscreen wheel, the peripheral rim or the drum.

While a particular embodiment of the microscreen support wheel has been shown and described, it will be obvious to persons skilled in the art that changes and modifications might be made without departing from the invention in its broader aspects.

What is claimed is:

1. In an apparatus for screening a water supply comprising a tank, a drum mounted in said tank and having an open end, a closed end rotating horizontally around a central longitudinal axis, a replaceable microscreen media grid structure mounted on the outer periphery of said drum, a rigid frame rotatably supporting said drum by means of a journal bearing at the closed end and a plurality of support wheels at the open end, and means for introduction of the water to be screened into the interior of said drum, wherein a given elevation of screened water is maintained in said tank as said drum rotates within said tank on said horizontal axis with the uppermost section of its cylindrical surface above said elevation for cleaning purposes, an improved microscreen support comprising:

a plurality of pivotable support wheel assemblies attached to said frame and supporting the inner periphery of the open end of said rotating drum, each of said wheel assemblies comprising means designed for providing corrosion-resistant microscreen support having a tread surface with a coefficient of friction sufficiently low to allow negligible microscreen drum vibration yet permit microscreen drum slippage, and designed to withstand a significant edge loading while causing minimal load transfer or imbalanced loads to the wheel hub and wheel supports, including:

a mounting bracked secured to said frame; and a pair of polymeric wheels rotatably mounted on said bracket, each of said wheels having a tread surface with a center portion and two sloping edge portions, two side faces and an axial bore designed to accept bearing means on each of said side faces, wherein said polymeric wheels are provided with annular stress relief grooves cut into each face of said wheels to accommodate substantial edge loading originating from lateral shifting of said drum on said horizontal axis, without losing structural or rotational integrity.

2. The microscreen support defined in claim 1 wherein said polymeric wheels are mounted laterally adjacent to each other.

3. The microscreen support defined in claim 2 wherein said wheels are mounted on said mounting brackets so that the plane passing through the axis of the laterally adjacent wheels is substantially perpendicular to a radius drawn from the central axis of said drum.

4. The microscreen support defined in claim 1 wherein said support wheels are fabricated from a nylon formulation having the properties of self-lubrication, low water absorption, a high flexural modulus, good chemical resistance and low deformation under load.

5. The microscreen support assembly defined in claim 1 wherein said tread of said support wheel has a flat center and two substantially equally sloping edges.

6. The microscreen support assembly defined in claim 5 wherein the tread of said support wheel has a flat center section extending approximately one-half the width of said wheel.

7. The microscreen support assembly defined in claim 1 wherein said support wheel has substantially parallel sides.

8. The microscreen support wheel assembly defined in claim 1 wherein the center of each of said annular stress relief grooves is on the order of 1/6th the distance between the peripheral edge of said axial bore and the peripheral tread of said wheel.

9. The microscreen support assembly defined in claim 8 wherein said annular stress relief grooves are cut to a depth of approximately one-fourth to one-eighth the depth of the total thickness of the wheel.

10. The microscreen support assembly defined in claim 9 wherein the width of said stress relief grooves is approximately one-fourth of the distance between the peripheral edge of said axial bore and said tread surface.

11. A nylon microscreen support wheel comprising means designed for providing corrosion resistant microscreen support having a tread surface with a coefficient of friction sufficiently low to allow negligible microscreen drum vibration yet permit microscreen drum slippage, and designed to withstand a significant edge loading while causing minimal load transfer of imbalanced loads to the wheel hub and wheel supports, said wheels comprised of:
   an axial bore designed to accept bearing means;
   a tread surface having a substantially flat center section and crowned edges; and
   a pair of parallel sides with annular stress relief grooves cut therein a substantial equal distance into each of said sides and approximately equal distance from the peripheral edge of said axial bore and said crowned tread surface.

12. A nylon microscreen support wheel comprising means designed for providing corrosion-resistant microscreen support having a tread surface with a coefficient of friction sufficiently low to allow negligible drum vibration yet permit microscreen drum slippage, and designed to withstand a significant edge loading while causing minimal load transfer of imbalanced loads to the wheel hub and wheel supports, said wheel comprising:
   a base material having the properties of self-lubrication, low water absorption, good chemical resistance and low deformation under load;
   an axial bore designed to accept bearing means;
   a tread surface having a substantially flat center section approximately one-half the width of said wheel and two equally sloping edges; and
   a pair of substantially parallel side faces, each of which having an annular stress relief groove cut therein, the center of said groove on the order of one-half the distance between the peripheral edge of said axial bore and the peripheral tread surface, being cut on the order of one-fourth to one-eighth the depth of the total thickness of said wheel and being located on the order of one-fourth the width of the distance between the peripheral edge of said axial bore and said tread surface.

* * * * *